United States Patent [19]

Dronet

[11] 4,394,115
[45] Jul. 19, 1983

[54] FORMING ARRANGEMENT FOR MACHINES MAKING RECEPTACLES OUT OF THERMOPLASTIC MATERIAL

[75] Inventor: Jean-Marc Dronet, Falaise, France

[73] Assignee: Societe d'Application Plastique Mecanique et Electronique Plastimecanique S.A., Falaise, France

[21] Appl. No.: 250,595

[22] Filed: Apr. 3, 1981

[30] Foreign Application Priority Data

Apr. 3, 1980 [FR] France ................................. 80 07539

[51] Int. Cl.³ .......................... A23G 1/20; B29C 3/00
[52] U.S. Cl. ................................... 425/122; 264/509;
425/126 R; 425/296; 425/521
[58] Field of Search ........... 425/521, 122, 296, 126 R, 425/324, 129; 264/509

[56] References Cited

U.S. PATENT DOCUMENTS 3,957,412 5/1976 Lechevallier .................... 425/324.1
4,335,635 6/1982 Hautemont ......................... 425/122

FOREIGN PATENT DOCUMENTS 2256013 1/1979 France .
2340185 7/1980 France .

*Primary Examiner*—Jay H. Woo

[57] ABSTRACT

An improved heat-forming deep-drawing molding machine for producing receptacles with thermoplastic banderoles, which machine includes a mandrel which coacts with a mold or a forming chamber for forming a closed banderole coil or loop. The mandrel has substantially the shape of the mold cavity. The mandrel slidably reciprocates in the mold cavity relative to the mold or the forming chamber and has a fixed transverse section relative thereto. The mandrel is composed of stationary and rotatable parts relative to the forming chamber. The rotating parts coact with the curved or round parts of the forming chamber or mold cavity. The rotating parts include suction channels which bias the banderole thereagainst so as to effect an advancing movement of the banderole in the forming chamber. The suction channels are operatively connected to a vacuum source.

5 Claims, 10 Drawing Figures

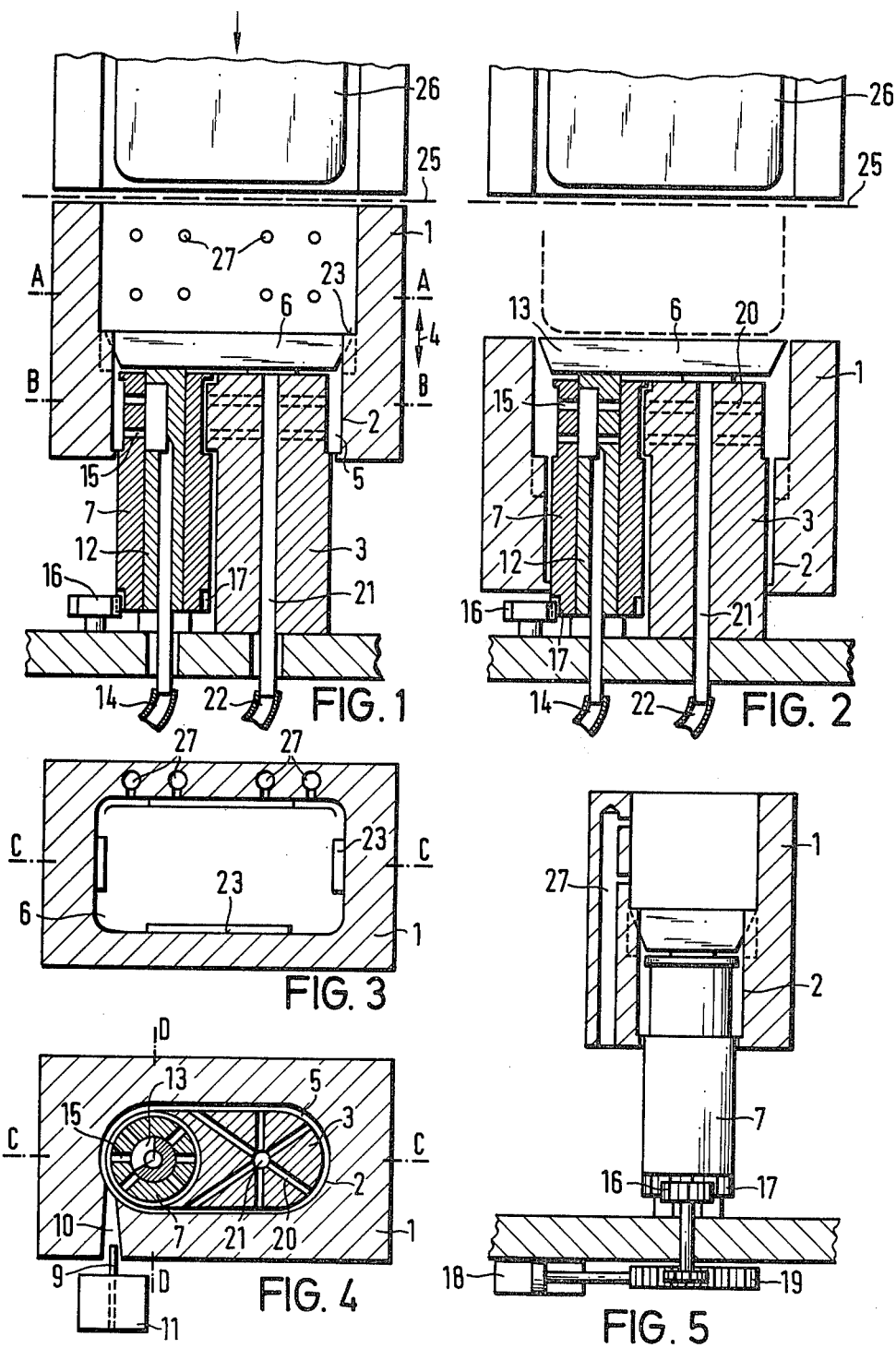

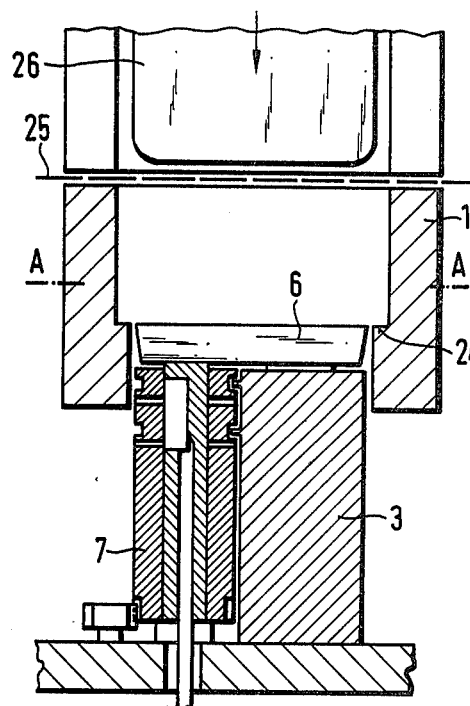
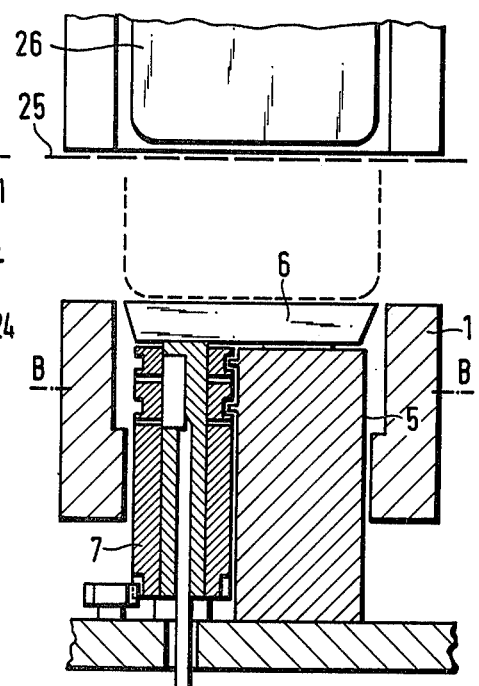
FIG. 6    FIG. 7
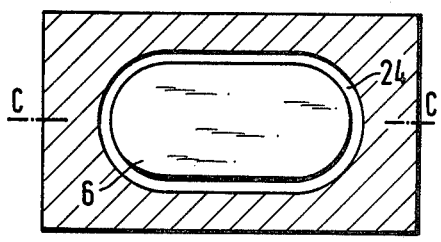
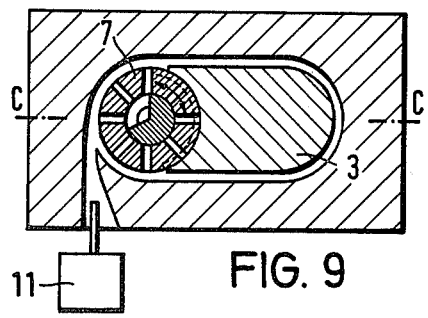
FIG. 8    FIG. 9
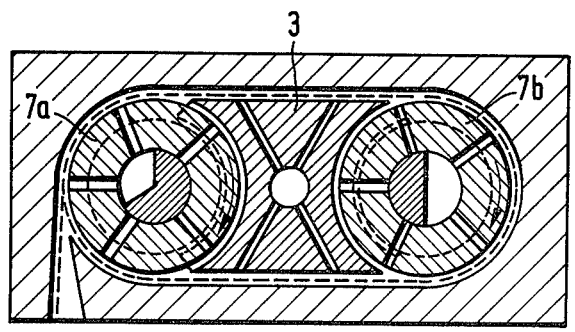
FIG. 10

FORMING ARRANGEMENT FOR MACHINES MAKING RECEPTACLES OUT OF THERMOPLASTIC MATERIAL

The present invention relates to machines for producing receptacles by heat-forming a thermoplastic material, which machines are provided with means for forming and shaping the receptacles during heat-formation.

Such machines are designed to heat-form a band or strip of thermoplastic material, whereby receptacles, such as pots of different shapes can be produced at high output speeds and can be provided with laterally applied strips which have been stretch-formed and adhered thereto by the application of heat and/or pressure. For this purpose, in addition to the conventional work stations for forming, filling, positioning a cover, closing and sealing the pots or receptacles and separating the heat-formed pots, the arrangements also must include means for introducing bands or strips into the molds where the pots or receptacles must be heat-formed.

The problem that is posed by the introduction of such strips or bands into the mold may be resolved in different ways, particularly according to the solution proposed by the French Pat. No. 2,256,013, which describes methods for molding receptacles or pots of rectangular shape. Also such means are described in the French patent of addition No. 77.031 32 which was filed Feb. 4, 1977 and published under No. 234 0185.

Nevertheless, these prior art arrangements have not resolved the problem posed by the stretching by heat-forming of receptacles to form oblong shapes, in particular rectangular shapes.

In the case of such oblong-shaped receptacles, in effect, the simple guiding of the additional strip by the walls of the mold or by means of a honeycombed or labyrinthine system of passages has proven inadequate, because the strip or band has a tendency to coil without assuming the shape of the walls of the mold or of the honeycombed or labyrinthine system of passages, so that the uniformity and security of the strip or band necessary for an automatic functioning at high production speeds cannot be assured. Moreover, the use of a suction mandrel to introduce the strip or band does not result in a resolution of the problem due to the fact that such a mandrel has by necessity a circular action and cannot follow a rectangular contour and only follows poorly an oblong contour.

SUMMARY OF THE INVENTION

It is an object of this invention to provide an arrangement which overcomes the afore-described drawbacks by forming a loop in the mold or in the honeycombed or labyrinthine passage which has at least approximately the shape of the mold, and which contains a mandrel having the general shape of the mold, which mandrel is slidably mounted in the mold. The configuration of the mold with respect to the wall of the honeycombed or labyrinthine passage or the mold is parallel thereto and fixed relative to the honeycombed passage or the mold in transverse section. Such configuration is closely parallel with respect to that of the honeycombed passage or the mold in such a way as to define a very narrow guide passage for the strip or band. Another feature of the invention resides in that the mandrel is composed and formed of a plurality of parts which are fixed in transverse section with respect to the honeycombed passage, and such mandrel includes other rotatable parts; the latter parts define portions of the honeycombed passage and the mold and have an approximately circular cross-section or have angles of curvature. These rotatable parts include suction channels for the strip or band which are in communication with a source of vacuum or a source of reduced pressure. These rotatable parts confront the strip along its travel through the labyrinthine or honeycombed passage in such a way as to be able to contribute to the entrainment of the strip or band and its positioning in the honeycombed passage or the mold.

The invention also contemplates the following preferred features:

(a) The strip or band is formed along a honeycombed passage and a mandrel assures the transfer of the strip or band in the mold, the assembly of which mandrel is provided for this purpose with suction channels in communication with a source of vacuum during the transfer phase.

(b) The mandrel supports the bottom of the principal forming mold, which is mounted on the mandrel via a recessed portion and which applies the strip or band banderoles against the walls of the mold during the retraction movement of the mandrel with respect to the mold.

(c) The mandrel is fixed with respect to the frame of the machine and the mold is reciprocally movable parallel to the mandrel walls.

(d) The rotation of the movable parts of the mandrel is assured by a gear train which is powered by means of a piston-cylinder connected to a gear track.

BRIEF DESCRIPTION OF THE DRAWINGS

Further objects and advantages of the invention will be apparent from the following description of typical embodiments, in preferred form, taken in connection with the attached drawings, in which:

FIGS. 1 and 2 are two schematic elevational views in cross-section of an arrangement in accordance with the invention shown in two different operative positions, along lines C—C of FIGS. 3 and 4;

FIGS. 3 and 4 are schematic cross-sectional plan views, respectively along lines A—A and B—B of FIGS. 1 and 2;

FIG. 5 is a schematic elevational cross-section along line D—D of FIG. 4;

FIGS. 6 and 7 are two cross-sectional elevational schematic views of a second embodiment of the invention along lines C—C of FIGS. 8 and 9;

FIGS. 8 and 9 are schematic cross-sectional views along lines A—A and B—B of FIGS. 6 and 7, respectively; and FIG. 10 is a view analogous to that of FIGS. 4 and 9 illustrating schematically a further embodiment of the invention in plan cross-section.

DETAILED DESCRIPTION

In all of the drawings the pots or receptacles which may be manufactured with the heat-forming machine are not illustrated. These receptacles may have diverse shapes, and are well-known to a man skilled in the art. Such receptacles are illustrated in FIGS. 1 and 2 of French Pat. No. 1 330 730 which is incorporated herein by reference.

If such a machine is to be modified to include a banderole, for example, the object of the invention would be to place the strip or band (banderole) system at the level of the post 13 (station B,PF) of the machine illustrated in FIGS. 1 and 2 of said French Pat. No. 1 330 730 and the strip or bands would have to be introduced into the mold 5 prior to the forming operation of the pots or receptacles, in such a manner as to set the strip against the lateral wall of the receptacles so that the strips are fixed on the lateral wall during their forming operation.

For introducing the strip or bands into the molds it is possible to accomplish this in different ways, specially by introducing directly into the molds the strip or bands or by the intermediary of a forming honeycombed passage. These two solutions are described in French Pat. No. 2,256,013. It is also possible to find a description of such a process in German Pat. No. 568,834 as well as in the German utility model No. 19 69 306.

For these reasons only those examples of embodiments have been illustrated which are adapted for use with the afore-described arrangements of the cited French Pat. Nos. 2,256,013 and 2,340,185. Adaptation of the same arrangement to different machines would be self-evident to a man skilled in the art.

Accordingly, the invention has as a general object to provide a strip or band (banderole) for pots or receptacles of oblong shape, such as those having a generally rectangular shape, whereby one utilizes in combination with the mold 1 a closed honeycombed or labyrinthine forming passage 2, a suction mandrel 3 which supports the bottom 6 of the punch of the mold 6, which suction mandrel 3 longitudinally slidably moves in the directions of the double arrow 4 relative to the mold 1 and which has a configuration which remains fixed relative to the honeycombed forming passage and mold with respect to their transverse cross-sections, which configuration is closely parallel to and follows that of the forming passage 2 or mold 1 in such a way as to define between mandrel 3 and mold 1 a very narrow guide passage 5 for permitting the advance of the strip or band therethrough.

In the examples of FIGS. 1 to 5 the introduction of the strip or band into the honeycombed passage 2 which constitutes a forming chamber and is superposed on the mold 1 (FIG. 1), is effected by means of a suction mandrel 3 (FIG. 2), whereas in the embodiment of FIGS. 6 to 9 the introduction of the strip or band is effected directly into the mold 1 and the band is simply pressed against the walls of the mold 1 by the bottom 6 during the relative movement of the mold 1 with respect to the mandrel 3 (remounting of the mold, FIG. 1).

The mandrel 3 is preferably composed and constituted by fixed parts 3 (shown in transverse section in FIGS. 4, 9 and 10) with respect to the mold 1 or the honeycombed passage 2 and of rotatable parts 7.

In the zone of the rotatable parts, the honeycombed passage 2 or the mold, and in every case the mandrel 3, have a circular contour, whereas the rest of the mold 1, the forming passage 2 or the mandrel 3 have the required oblong shape.

The rotatable mandrel 3 is provided with passages or channels 15 which are in communication with a vacuum source via a passage which includes the inlet 10 for the strip or band 9 and its passage to the fixed mandrel 3.

For this purpose in the illustrated embodiment the mandrel 7 turns about the shaft 12, which includes a suction passage 13 in communication with a conduit 14 which is connected to an appropriate vacuum source. The channels 15, disposed in the rotatable mandrel 7 are successively placed in communication with the passage 13; the mandrel 7 is rotatably driven by the gear wheel 16 which meshes with the gear crown 17 of the mandrel. As is illustrated in FIG. 5, the pinion 16 can be driven by a gear rack 19 which is actuated by means of a piston cylinder arrangement 18; of course any other type of driving means is also suitable.

The arrangement of the invention functions as follows:

The strip or band 9 is guided by any conventional guide means 11, such as pushing means, roller feed means, etc., so that the band is fed to inlet 10 prior to being cut or is continuously paid out from a supply roller (not illustrated). The strip or band is introduced into the forming passage 2 (FIGS. 1–5) or into the mold 1 (FIGS. 6–9) so that it follows the passage 5, which is defined by the mandrel 3 and 7 and the mold 1, so that a forming passage 2 is formed between the mandrel and the wall of the mold 1. This feeding movement by means of the introducing means 11 is thereafter taken up by the action of the turning mandrel 7 which comes into play and which finishes the operational disposition of the strip or band.

This arrangement permits the easy operative placing of knives to transversely cut the strip or band on the internal surface of the forming passage 2 or the mold 1 at any distance from the inlet 10 to the forming passage 2 or the mold 1.

In the embodiment of FIGS. 1-5, once the strip or band is completely introduced, the suction channels 20 of the fixed mandrel 2 are connected to a vacuum source, for example, by means of the conduits 21, 22 and the strip or band thereafter is biased against the mandrel 3. The descending movement of the assembly of forming passage 2 and mold 1 from the position illustrated in FIG. 1 to the position illustrated in FIG. 2 causes the mandrel 3 to transfer the strip or band into the mold 1. Since the vacuum is interrupted the strip or band stretches and is pressed and biased against the wall of the mold 1. During the remounting of this mold, the bottom of the mold or punch 6 biases the strip or band against the wall of the mold, particularly in the angular or curved portions thereof, so that the strip or band is retained against any descending movement by the abutments 23 extending into the mold cavity of the mold 1 at its base and cooperate with the corresponding pockets which are disposed in the bottom of the punch 6.

As is illustrated in FIGS. 6–9 the strip or band may be directly introduced into the mold 1 in which case the mandrel 3, 7 does not have the function of transferring but solely serves to form the guide channel forming chamber for the strip or band along its walls. Nevertheless, the rotatable part 7 maintains its final introducing function. The bottom 6 which coacts with punch 26 of the mold does not necessarily act to apply the strip or band against the walls of the mold 1 and it may be inserted into the mold at a distance from the walls as illustrated in FIG. 8, where the mold 1 has a lower edge or abutment 24 which conforms to the shape of the bottom 6 of the mold.

The embodiment of FIGS. 1-5 is preferred because it permits the introduction of a strip or band into the space 5 at the same time while there is in progress a molding operation in the mold 1 (FIG. 1) the transfer taking place between two molding operations.

In the drawings the reference character 25 indicates the principal thermoplastic sheet into which the receptacles are heat-formed by the punch 26; and the reference character 26 indicates the premolding punch which is pressed into the sheet 25 at the molding station such as station B in French Pat. No. 1,330,730. Reference character 27 indicates the various suction channels which are provided in the walls of the mold 1 for maintaining the strip or band pressed against the mold walls.

The channels 27 are not always necessary. Moreover, it is possible to dispose them in different zones, for example at the angular parts of the mold walls. In the embodiment illustrated in FIG. 3, these suction channels are disposed in the recovery zone of the extremities of the strip or band which suffices to maintain the strip or band in place.

It is of course understood that the various arrangements of the invention are in practice mounted on the heat-forming machine in combination with mold and mandrel forming-arrangements or blocks which can operate with the desired production cadence.

In the illustrated embodiments there is represented one mandrel which supports the bottom of the mold and which is composed of a fixed and a rotatable part. It is also possible to provide several rotatable parts in one mandrel, for example two mandrels 7a, 7b (FIG. 10), whereby each rotatable mandrel is mounted at one end of the oblong shape of the principal mandrel 3; three mandrels can also be operatively arranged if the main mandrel is of triangular shape; four mandrels can be arranged for a rectangular shape of large size, etc.

One of the variants described immediately above, is illustrated in FIG. 10, where one main mandrel is composed of a fixed part 2 and two rotatable parts 7a and 7b.

It is of course possible to mount a larger number of movable parts on such an arrangement.

The invention is not limited to the described example and may be adapted to different types of machines, for example to machines wherein the mandrel does not support the bottom 6 of mold 1, such as is for example described in German Pat. No. 568.834 or to machines which have a transfer piston for the strip or bands on which a mandrel may be mounted, such as is described in German utility model No. 1,969,306 or French Pat. No. 2,034,915.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. An improved heat-forming molding machine for producing by deep drawing receptacles of thermoplastic material from plastic strips and sheets including means for feeding a plastic band into the mold cavity of the machine; the improvement comprising,
a fixed mandrel;
a mold having a mold cavity reciprocally movable relative to said fixed mandrel, said mandrel thereby moving into and out of said mold cavity,
said mandrel and/or mold defining a forming chamber adapted to receive a plastic banderole, which forming chamber and mandrel have contours which substantially correspond to that of the mold cavity so that said mandrel has a substantially fixed transverse cross-sectional area with respect to the forming chamber and mold cavity to thereby define a narrow guide passage for the plastic banderole;
said mandrel including a plurality of parts, a first number of these parts having transverse sections which remain fixed relative to said forming chamber and a second number of these parts have transverse sections which rotate relative to said forming chamber, the latter sections forming part of round or curved portions of the forming chamber, said rotatable transverse sections including suction channels for coacting and biasing the banderole against the rotatable parts of the mandrel to thereby impart an advancing motion to the banderole, said suction channels being in operative communication with a vacuum source.

2. The improvement in a heat-forming molding machine as set forth in claim 1, wherein said banderole is formed in a forming chamber and the mandrel effects the transfer of the banderole into the mold, said mandrel having said suction channels.

3. The improvement in a heat-forming molding machine as set forth in claim 2, wherein said mandrel is adapted to support a bottom portion of said mold which bottom portion has a widened part which is adapted to press the banderole against the inner wall of the mold during the retraction of the mandrel relative to the mold.

4. The improvement in a heat-forming molding machine as set forth in claim 3, wherein said mandrel is fixedly mounted on the frame of the machine and the mold is reciprocally mounted on the frame of the machine.

5. The improvement in a heat-forming molding machine as set forth in claim 4, wherein said second number of rotatable parts are operatively connected to a driving gear train operatively mounted on the frame of the machine.

* * * * *